United States Patent

Yurosko

[11] Patent Number: 5,127,033
[45] Date of Patent: * Jun. 30, 1992

[54] DENTAL X-RAY AND TRANSPARENT MOUNT

[76] Inventor: John J. Yurosko, 123 Shamrock Blvd., Venice, Fla. 34293

[*] Notice: The portion of the term of this patent subsequent to Jul. 23, 2008 has been disclaimed.

[21] Appl. No.: 607,163
[22] Filed: Oct. 31, 1990
[51] Int. Cl.$^5$ .............................. H05G 1/00
[52] U.S. Cl. .................. 378/204; 378/206; 378/163; 378/168
[58] Field of Search .......... 378/204, 206, 210, 168, 378/163, 166, 170, 182, 187, 165, 194, 172, 205

[56] References Cited

U.S. PATENT DOCUMENTS 3,851,178 11/1974 Borden ......................... 378/168

FOREIGN PATENT DOCUMENTS 2332674 1/1974 Fed. Rep. of Germany ...... 378/187
0592218 7/1925 France ........................ 378/168

*Primary Examiner*—Janice A. Howell
*Assistant Examiner*—Don Wong
*Attorney, Agent, or Firm*—Charles J. Prescott

[57] ABSTRACT

An improved shape of a small rectangular dental x-ray, including a jacket for containing each unexposed dental x-ray and a mount for viewably retaining a complete set of expoded such dental x-rays. The improved dental x-ray shape includes three conventional, rounded corners and a notched or diagonally cut fourth corner which provides viewable indicia of orientation. The jacket includes orienting lines extending along two adjacent margins from the corner corresponding to the notched corner of the unexposed dental x-ray contained therein. The mount, formed of thin, pliable transparent sheet plastic material, includes a plurality of transparent pouches or pockets arranged thereon, each of which is similarly notched, shaped and structured to viewably receive and retain one such exposed improved dental x-ray. These pockets are divided into left, right and center regions corresponding to the regions of patients' teeth. Each pocket in the right and left regions is horizontally oriented with respect to the longer margin of the rectangular dental x-ray shape, while the pockets in the center of region are upright, these pocket orientations corresponding to the positioning of each unexposed dental x-ray within the jacket which is oriented in the patient's mouth in accordance with the line indicia contained on the jacket.

6 Claims, 3 Drawing Sheets

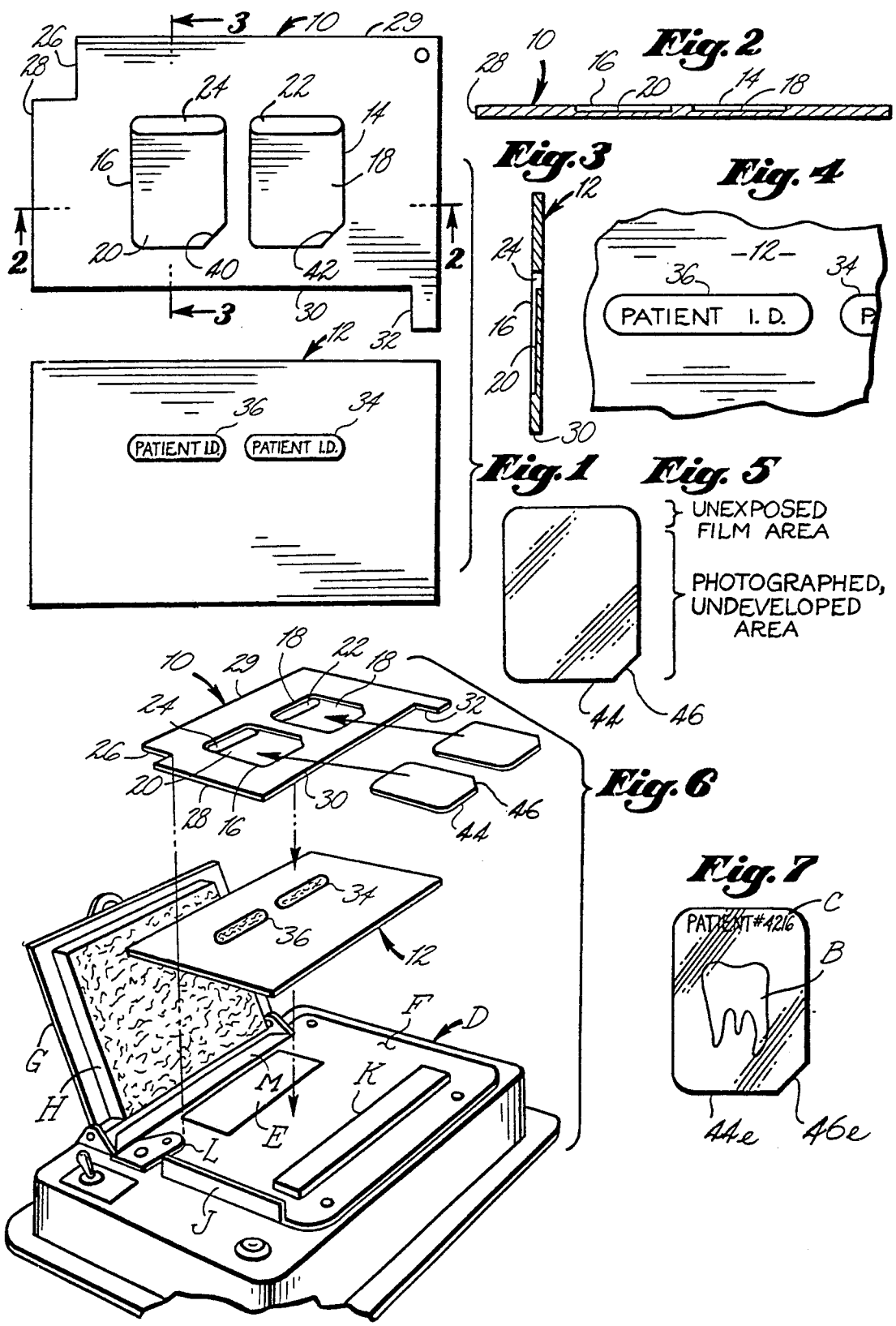

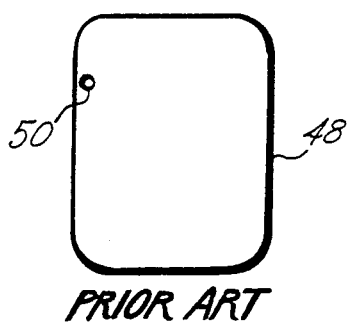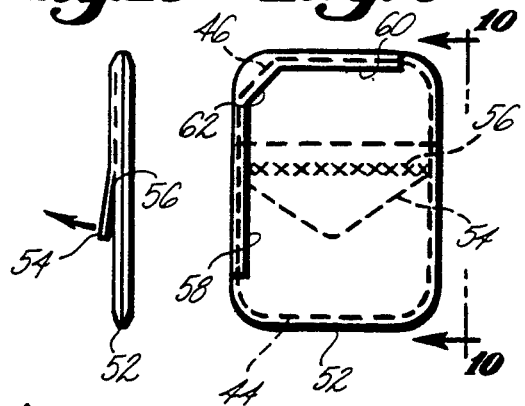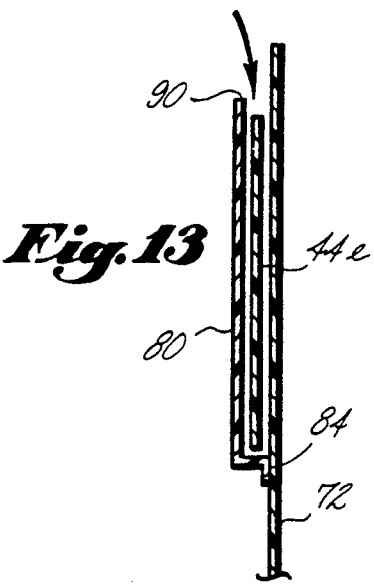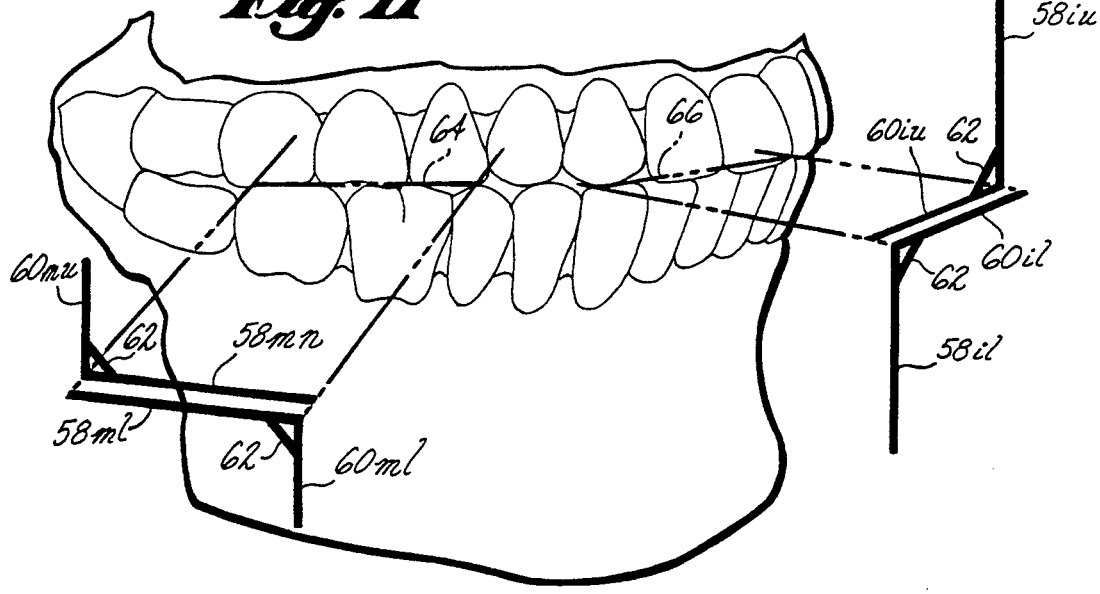

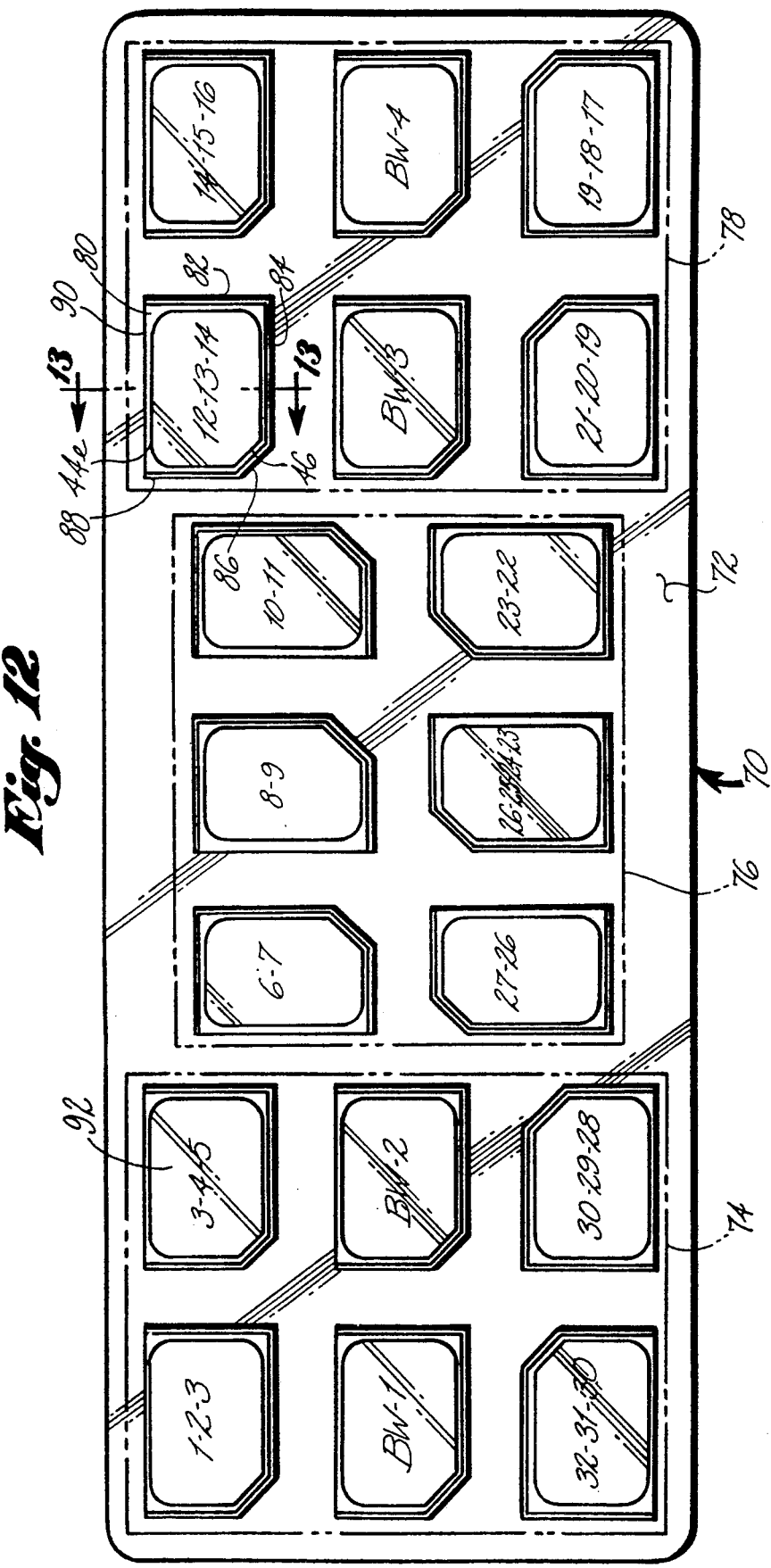

DENTAL X-RAY AND TRANSPARENT MOUNT

BACKGROUND OF THE INVENTION

This invention relates generally to dental x-rays and more particularly to an improved dental x-ray shape, the protective jacket containing the unexposed dental x-ray and a mount for such dental x-rays which provides for a proper viewable positioning of the exposed dental x-rays within the mount corresponding to the regions of a patient's teeth. The term "x-ray" is used herein to refer to a "radiograph".

Reference is made to my co-pending application Ser. No. 07/518,135 filed May 3, 1990 directed to a dental x-ray patient identification marking device with which the dental x-ray shape described and claimed in the present application is particularly useful.

Presently, dental x-rays are provided which are formed of relatively small x-ray material typically having rectangular dimensions of 1.2 inches wide×1.6 inches long. These conventional dental x-rays are uniformly radiused at each corner. This relatively small size is necessary to fit the unexposed dental x-ray, contained within a protective jacket, into the mouth of a patient against the inside surface of the tooth and gums to be x-rayed.

Also typical is to orient each dental x-ray generally horizontally with respect to back or molars and generally upright or vertical with respect to x-raying frontal teeth.

So as to provide some form of visible or viewable indicia for the practitioner to orient each dental x-ray within the patient's mouth, a small depression or dimple is formed along one margin near to one corner of the dental x-ray. This is provided so that the practitioner may have some indication of the orientation of the unexposed x-ray material after it is removed from the patient's mouth and exposed.

However, in many cases, the viewable depression is inadequate to avoid confusing the exposed x-rays both top to bottom and front to back in positioning the x-rays for viewing.

A separate problem has been addressed by the invention contained in my referenced co-pending application, i.e. the application of patient identification information onto each dental x-ray at one end thereof. The present invention is particularly useful in conjunction with a modified form of the mount contained in this co-pending application and as described herein.

The present invention provides an improved shape for a dental x-ray which facilitates certainty in orienting each x-ray from the time it is put within the patient's mouth in a correspondingly marked jacket to the time that each x-ray is placed into a transparent mount having specially shaped pouches or pockets corresponding to the shape and orientation of each x-ray of the patient's mouth.

BRIEF SUMMARY OF THE INVENTION

This invention is directed to an improved shape of a small rectangular dental x-ray, including a jacket for containing each unexposed dental x-ray and a mount for viewably retaining a complete set of exposed such dental x-rays. The improved dental x-ray shape includes three conventional, rounded corners and a notched or diagonally cut fourth corner which provides viewable indicia of orientation. The jacket includes orienting lines extending along two adjacent margins from the corner corresponding to the notched corner of the unexposed dental x-ray contained therein. The mount, formed of thin, pliable transparent sheet plastic material, includes a plurality of transparent pouches or pockets arranged thereon, each of which is similarly notched and shaped and structured to viewably receive and retain one such exposed improved dental x-ray. These pockets are divided into left, right and center regions corresponding to the regions of patients' teeth. Each pocket in the right and left regions is horizontally oriented with respect to the longer margin of the rectangular dental x-ray shape, while the pockets in the center of region are upright, these pocket orientations corresponding to the positioning of each unexposed dental x-ray within the jacket which is oriented in the patient's mouth in accordance with the line indicia contained on the jacket.

It is therefore an object of this invention to provide an improved dental x-ray shape having notched or cut indicia on one corner to insure proper orientation throughout the dental x-ray process.

It is another object of this invention to provide a jacket for protectively holding the unexposed x-ray having viewable line indicia contained thereon for proper positioning for exposure within the patient's mouth.

It is yet another object of this invention to provide an improved transparent mount for receiving and displaying a plurality of improved dental x-rays used and exposed in accordance with the jacket of the present invention so as to facilitate proper orientation and display of a complete set of dental x-rays.

In accordance with these and other objects which will become apparent hereinafter, the instant invention will now be described with reference to the accompanying drawings.

BRIEF DESCRIPTION OF THE DRAWINGS

FIG. 1 is a top plan view of an aperture plate for use in conjunction with an identification camera as described in my referenced co-pending application and as modified in accordance with the present invention.

FIG. 2 is a section view in the direction of arrows 2—2 in FIG. 1.

FIG. 3 is a section view in the direction of arrows 3—3 in FIG. 1.

FIG. 4 is an enlarged view of the defined writing area for placing patient identification therewithin.

FIG. 5 is a plan view of the improved dental x-ray of the present invention in its exposed but undeveloped condition.

FIG. 6 is an exploded perspective view of my referenced copending invention in conjunction with the identification camera and the improved dental x-ray of the present invention.

FIG. 7 is a plan view of the improved dental x-ray shown in FIG. 5 having been subjected to the secondary exposure process depicted in FIG. 6 and having been fully developed.

FIG. 8 is a plan view of a conventional dental x-ray.

FIG. 9 is a plan view of a protective jacket for the improved dental x-ray.

FIG. 10 is a view in the direction of arrows 10—10 in FIG. 9.

FIG. 11 is a perspective view of a patient's teeth depicting in schematic the use of line indicia on the jacket containing an unexposed improved x-ray shown in FIG. 9.

FIG. 12 is a plan view of the improved dental x-ray mount of the present invention.

FIG. 13 is an enlarged section view in the direction of arrows 13—13 in FIG. 12.

DETAILED DESCRIPTION OF THE INVENTION

CO-PENDING INVENTION

Referring now to the drawings and particular to FIG. 1 to 4 and 6, my co-pending invention is there shown. One embodiment of that invention is shown generally at numeral 10 in conjunction with a thin paper indicia card 12. The dental x-ray aperture plate 10 is fabricated of a flat sheet of aluminum or the like having a corner notch at 26 and a tab at 32 whose function will be described herebelow. The aperture plate 10 includes a pair of cavities 14 and 16 each having an elongated transverse hole 22 and 24, respectively, disposed at one end thereof through aperture plate 10.

Each cavity 14 and 16 also includes three uniformly contoured corners and a fourth corner at 40 and 42 which is notched diagonally at forty-five degrees to accommodate the improved dental x-ray of the present invention which will be described herebelow. The overall perimeter profile of each cavity 14 and 16 is substantially similar to that of the improved dental x-ray 44 shown in FIG. 5 which has been exposed within a patient's mouth, but is undeveloped. The depth of surfaces 18 and 20 of cavities 14 and 16 is such as to accommodate the thickness of each improved dental x-ray 44 such that, when placed within each cavity 14 and 16, the dental x-ray 44 is securely positioned therein.

An indicia card 12 is also provided having two defined writing areas 34 and 36 which, when placed beneath and in alignment with the margins 28, 29 and 30 of aperture plate 10, are viewable through, and in alignment with, holes 22 and 24. It is within these defined writing areas 34 and 36 that the dental practitioner may write or type the patient's identification indicia as desired.

As best seen in FIG. 6, the indicia card 12 is placed beneath the aperture plate 10 so that notche 26 is in alignment and registry around flat spring L of an identification camera shown generally at numeral D while the corresponding corner of indicia card 12 is held beneath spring L. The identification camera D also includes a flat working surface F having a light-emitting area E, a stop bar K and flanges J and M as shown. Lid G, hinge connected to the base of identification camera D, includes a layer of compressible foam material H which sandwiches the aperture plate 10, indicia card 12 and undeveloped dental x-rays 44 against working surface F when closed.

To establish proper alignment of aperture plate 10 and indicia card 12, tab 32 is sized to fit against the end of bar K, while edge 30 mates along the length of bar K. The opposite margin 29 mates against flange M, while the end margin 28 mates against flange J. Similarly, the corresponding margins of indicia card 12 are so aligned such that the defined writing areas 34 and 36 are in alignment with holes 22 and 24.

Once the arrangement shown in FIG. 6 is completed and lid G closed, a light source beneath light-emitting area E is momentarily activated to expose the patent identification indicia which has been imprinted within defined writing areas 34 and 36 onto dental x-rays A. After this second exposure of dental x-rays A and having been fully developed, the dental x-ray A' as a finished product is shown in FIG. 7, which includes an x-ray definition of the tooth area B, along with the patient identification indicia C which is positioned across the upper margin of the x-ray A'.

PRIOR ART DENTAL X-RAY

Referring to FIG. 8, the prior art dental x-ray 48 is there shown and includes a dimple or depression 50 which is formed into the x-ray material itself. This may be formed separately or after the dental x-ray 48 has been assembled into its sealed, protective jacket as shown in FIGS. 9 and 10 of the present invention. This dimple 50 is intended to aid the practitioner in the handling of the dental x-rays so that the x-rays may be properly positioned in a patient's mouth and exposed, and displayed and stored in transparent mounts so as to facilitate proper viewable orientation of each x-ray. However, in practice, the positioning and/or viewability of this dimple 50 is inadequate in that the x-ray may be reversed side to side or may become obscure because inadequately informed initially in the manufacturing process.

PRESENT INVENTION

The improved dental x-ray shape 44 has previously been described with respect to FIGS. 5 and 7. FIG. 5 depicts the developed but unexposed dental x-ray 44, while FIG. 7 shows the dental x-ray 44e having been fully exposed and developed, thus depicting both a subject tooth B and the patient identification indicia C. The improved dental x-ray shape 44 includes notch 46 which is cut or formed into one of the four corners of the rectangular-shaped dental x-ray material. The other three corners are uniformly radiused as shown.

Referring now to FIGS. 9 and 10, an improved dental x-ray jacket is shown at 52. This improved jacket 52 includes the same, well-known protective structural elements, including an envelope portion having a flap 54 which is heat sealed along 56 to the jacket 52 after the dental x-ray 44 (shown in dotted lines) and other protective wrappings are inserted therewithin. To open and remove the contents, the user simply pulls flap 54 in the direction of the arrow shown in FIG. 10 to tear the heat seal 54.

The improved jacket 52 also includes viewable indicia printed on one surface thereof in the form of a heavy longitudinal line 58 along the elongated margin of the rectangular shaped packet 52 and a transverse line 60 extending along the adjacent shorter margin of jacket 52. A heavier corner indicia portion 62 is provided at the upper left hand intersecting corner as shown in FIG. 9 which corresponds to the positioning of notch 46 formed into dental x-ray 44. The use of these indicia lines 58 and 60 will be described herebelow with reference to FIG. 11.

Referring additionally to FIG. 11, a perspective view of a user's jawbone and teeth is there shown. The use of the jacket 52 containing the improved dental 44 x-ray of the present invention is also depicted schematically showing only the line bar indicia printed on one surface of the jacket 52 as previously described. When the improved jacket 52 containing the improved dental x-ray 44 is used in conjunction with x-raying molars, the indicia lines 58 and 60 may be utilized to serve as both vertical positioning and proper rotational orientation of the dental x-ray 44. This is accomplished by orienting longitudinal line 58 in alignment with the occlusal or bite line 64 between the upper and lower teeth. When x-raying the upper molars, the practitioner orients the transverse line 60mu (molar upper) extending upwardly, while longitudinal line 58 is aligned with the bite line 64. Conversely, when the practitioner is x-raying the lower molars, the transverse line 60ml (molar lower) is downwardly extended. As may be seen, the corner notch indicia 62 is positioned either at the upper right or the lower left as shown, corresponding to the notch 46 in the dental x-ray 44.

Likewise, when x-raying the upper frontal teeth, the longitudinal line 58iu (incisor upper) is upwardly extended, with transverse line 60iu horizontally aligned with the bite line 66 of the incisors. When x-raying the lower incisors, the transverse line 60il (incisor lower) is aligned with frontal bite line 66 and longitudinal line 58il is downwardly extending. Again, notch indicia 62 is either at the lower right or the upper left corner of the jacket corresponding to the notch 46 of dental x-ray 44 contained therein.

DENTAL X-RAY Mount

Referring now to FIGS. 12 and 13, once the entire array of dental x-rays 44e have been exposed and developed, the present invention also provides for a unique transparent mount 70 for these exposed dental x-rays 44e to facilitate positioning of each exposed dental x-ray in its proper orientation corresponding to regions of the patient's mouth for viewing. The dental x-ray mount 70 includes a large transparent carrying sheet 72 fabricated of thin, transparent, pliable plastic and a plurality of smaller pocket sheets shown typically at 80 which are connected by heat sealing along three of the four margins thereof 82, 84, and 86, leaving the fourth margin 90 unconnected and forming a pocket to receive the exposed dental x-ray 44e in the direction of the arrow in FIG. 13. One corner 86 of pocket 80 is heat sealed on a diagonal as shown. This notched corner 86, coupled with the overall size of pocket sheet 80, is substantially similar to the corresponding shape, including notch 46, of the exposed dental x-ray 44e.

Note that the preferred width of the pocket is such that open margin 90 is positioned in close proximity to the corresponding longitudinal margin of exposed x-ray 44e. Notch 46 being smaller than the other three radiused corners, results in being unable to fully insert the exposed dental x-ray into pocket 80 if it is positioned incorrectly.

To further facilitate quick and easy and correct placement of each of the various exposed and developed dental x-rays 44e, three separate regions 74, 76 and 78 each containing a plurality of pockets 80 as previously described are provided. Region 74 is intended to viewably retain the right side molar x-rays, region 76 is intended to contain the front incisor x-rays, while region 78 is intended to contain the left molar x-rays. Also provided imprinted onto each transparent pocket 80 are the well known tooth designations used in the dental practice shown typically at numeral 92.

Note importantly that the pockets 80 of each region intended to receive a dental x-ray 44e of an upper tooth have the unconnected margin upwardly extending and are positioned in the upper portions of regions 74, 76 and 78, while the pockets 80 intended to receive dental x-rays of the lower teeth have unconnected margin 90 downwardly facing in relation to sheet 72 and are in the lower portion of region 74, 76 and 78. These tooth indicia 92, particularly coupled with the horizontal or upright orientation of each pocket 80 and further coupled with the upwardly or downwardly extending openings of pockets 80 for use in conjunction with dental x-rays of the upper or lower teeth, respectively, serve to quickly and clearly identify the particular region and specific teeth shown in each dental x-ray.

Although the preferred embodiment of mount 70 is as above described, the same structural improvements may also be applied within the scope of this invention to otherwise well-known mounts fabricated of paper and having an x-ray viewing hole positioned through each pocket and mating carrying sheet surface.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. In a dental x-ray having a uniform rectangular shape and uniform round corner structured for use in conjunction with an identification camera having:
   a removable, thin aperture plate structured for positive flat positioning and orientation atop a light-emitting area of a working surface of said camera;
   said aperture plate having an elongated hole therethrough disposed at one end of means for aligning said dental x-ray atop and flat against said aperture plate whereby said hole is aligned with a particular portion of said dental x-ray;
   the improvement comprising:
   a notch formed across one said corner;
   said aligning means including structure for mating against said notch whereby said dental x-ray may be inserted within said aligning means in only one orientation.

2. An improved dental x-ray device as set forth in claim 1, wherein:
   said aligning means is a cavity formed of uniform depth into the surface of said aperture plate having a perimeter which is substantially similar to that of said x-ray°
   said notch is an angular cut across said one corner smaller than said uniform rounded corner.

3. An improved intra oral dental x-ray comprising:
   a flat flexible sheet of x-ray material sized to fit into a patient's mouth having a uniform rectangular shape and uniform rounded contours on three of the four corners of said sheet;
   the fourth said corner of said sheet cut to form a notch having a different shape than said three uniform round corners whereby viewable indicia of right-to-left side of mouth orientation of said dental x-ray is provided;
   a rectangular protective jacket for containing an unexposed said dental x-ray;
   said jacket having line indicia on the exterior thereof extending rom one corner of said jacket in either direction along two adjacent margins of said jacket;
   said jacket one corner corresponding with said notch of said dental x-ray for providing viewable indicia of the orientation of said unexposed dental x-ray within said jacket during x-ray exposure within a patient's mouth.

4. An improved dental x-ray as set forth in claim 3, further comprising:

transparent, flexible, pliable plastic dental x-ray mount having a plurality of transparent rectangular pockets open along one margin of each pocket;

each said pocket having a notch-shaped corner opposite said open margin, said pocket and said notch-shaped corner similar in size and shape to said dental x-ray and sized to snugly receive one said dental x-ray therewithin, said notch-shaped corner providing a viewable indicia of correct orientation of said dental x-ray within each said pocket;

said plurality of pockets defining separate right, left and center regions on said mount;

said right and left regions having a portion of said plurality of pockets oriented to position and hold exposed said dental x-rays in a horizontal orientation of said rectangular shape of said dental x-ray;

said center regions having the remaining portion of said plurality of pockets oriented to position and hold exposed said dental x-rays in an upright orientation of said rectangular shape of said dental x-ray.

5. In a jacket for protectively holding an unexposed rectangular dental x-ray having a uniform ground contour of three of the four corners of said x-ray, the fourth corner of said dental x-ray cut to form a notch having a different shape than said three uniform round corners whereby viewable indicia of orientation of said dental x-ray is provided, the improvement comprising:

line indicia on the outer surface of said jacket extending from one corner of said jacket in either direction along two adjacent margins of said jacket;

said jacket having one corner corresponding with said notch of said dental x-ray for providing viewable indicia of the orientation of said unexposed dental x-ray within said jacket during x-ray exposure within a patient's mouth.

6. A transparent dental x-ray mount for reviewably holding a quantity of exposed rectangular dental x-rays each having a uniform round contour on three of the four corners, the fourth corner of said dental x-ray cut to form a notch having a different shape than said three uniform round corners whereby viewable indicia of orientation of each said dental x-ray is provided, said mount comprising:

a thin, transparent, flexible plastic sheet having a plurality of transparent rectangular pockets attached thereto forming an opening along one margin of each said pocket;

each said pocket having a notch-shaped corner opposite said open margin, said pocket and said notch-shaped corner similar in size and shape to said dental x-ray and sized to snugly receive one said dental x-ray therewithin, said notch-shaped corner providing a viewable indicia of correct orientation of said dental x-ray within each said pocket;

said plurality of pockets defining separate right, left and center regions on said mount;

said right and left regions having a portion of said plurality of pockets oriented to position and hold exposed said dental x-rays in a horizontal orientation of said rectangular shape of said dental x-ray.

* * * * *